US010995200B2

(12) United States Patent
Eguchi et al.

(10) Patent No.: US 10,995,200 B2
(45) Date of Patent: May 4, 2021

(54) KAOLIN CLAY FOR THERMOPLASTIC RESIN COMPOSITION AND THERMOPLASTIC RESIN COMPOSITION

(71) Applicant: SHIRAISHI KOGYO KAISHA, LTD., Osaka (JP)

(72) Inventors: Kenichiro Eguchi, Amagasaki (JP); Yutaka Minamino, Amagasaki (JP); Ruriko Nakagawa, Amagasaki (JP); Kosuke Kawai, Amagasaki (JP); Masahiro Matsui, Osaka (JP)

(73) Assignee: SHIRAISHI KOGYO KAISHA, LTD., Osaka (JP)

( * ) Notice: Subject to any disclaimer, the term of this patent is extended or adjusted under 35 U.S.C. 154(b) by 53 days.

(21) Appl. No.: 16/307,790

(22) PCT Filed: May 31, 2017

(86) PCT No.: PCT/JP2017/020185
§ 371 (c)(1),
(2) Date: Dec. 6, 2018

(87) PCT Pub. No.: WO2017/212988
PCT Pub. Date: Dec. 14, 2017

(65) Prior Publication Data
US 2019/0177512 A1    Jun. 13, 2019

(30) Foreign Application Priority Data

Jun. 7, 2016   (JP) .............................. JP2016-113279

(51) Int. Cl.
| | | |
|---|---|---|
| C08K 3/34 | (2006.01) | |
| C08K 9/06 | (2006.01) | |
| C09C 1/42 | (2006.01) | |
| C09C 3/12 | (2006.01) | |
| C08L 25/04 | (2006.01) | |
| C08L 67/00 | (2006.01) | |
| C08L 77/00 | (2006.01) | |
| C08L 81/02 | (2006.01) | |
| C08L 101/00 | (2006.01) | |
| C08L 67/02 | (2006.01) | |

(52) U.S. Cl.
CPC ............... *C08K 9/06* (2013.01); *C08K 3/346* (2013.01); *C08L 25/04* (2013.01); *C08L 67/00* (2013.01); *C08L 67/02* (2013.01); *C08L 77/00* (2013.01); *C08L 81/02* (2013.01); *C08L 101/00* (2013.01); *C09C 1/42* (2013.01); *C09C 3/12* (2013.01); *C01P 2004/61* (2013.01); *C01P 2004/62* (2013.01); *C01P 2006/60* (2013.01)

(58) Field of Classification Search
None
See application file for complete search history.

(56) References Cited

U.S. PATENT DOCUMENTS

| | | | | |
|---|---|---|---|---|
| 4,935,062 | A * | 6/1990 | Brown ...................... | C09C 1/42 106/287.16 |
| 5,871,846 | A | 2/1999 | Freeman et al. | |
| 6,013,699 | A | 1/2000 | Freeman et al. | |
| 6,197,105 | B1 | 3/2001 | Freeman et al. | |
| 2008/0242775 | A1 | 10/2008 | Soma et al. | |
| 2017/0306145 | A1* | 10/2017 | Minami ................. | C08L 67/04 |

FOREIGN PATENT DOCUMENTS

| | | |
|---|---|---|
| CN | 101270229 A | 9/2008 |
| CN | 104530294 A | 4/2015 |
| CN | 105219337 A | 1/2016 |
| JP | 64-45447 A | 2/1989 |
| JP | 1-126375 A | 5/1989 |
| JP | 01126375 A * | 5/1989 |
| JP | 10-88028 A | 4/1998 |

OTHER PUBLICATIONS

International Search Report dated Jul. 25, 2017, issued in counterpart International Application No. PCT/JP2017/020185 (2 pages).
Notification of Transmittal of Translation of the International Preliminary Report on Patentability (Form PCT/IB/338) issued in counterpart International Application No. PCT/JP2017/020185 dated Dec. 20, 2018, with Forms PCT/IB/373 and PCT/ISA/237. (9 pages).
Extended (Supplementary) European Search Report dated Sep. 20, 2019, issued in counterpart EP application No. 17810167.1. (7 pages).
Zhang Q. et al., "A novel biodegradable nanocomposite based on poly (3-hydroxybutyrate-co-3-hydroxyhexanoate) and silylated kaolinite/silica core-shell nanoparticles", Applied Clay Sciene, Elsevier, Amsterdam, NL, Sep. 1, 2009, vol. 46, No. 1, pp. 51-56, cited in European Search Report dated Sep. 20, 2019. (6 pages).
Qian Zhang et al., "Synthesis and Characterization of Silylated Kaolinite/silica Core-Shell Nanoparticles", Applied Mechanics and Materials, Sep. 1, 2011, vol. 105-107, pp. 1760-1763, cited European Search Report dated Sep. 20, 2019. (5 pages).
Office Action dated Oct. 8, 2020, issued in counterpart European Patent Application No. 17810167.1 (6 pages, in English).
English Translation of JPH01126375A (Coated Inorganic Filler for Synthetic Resin Filler, published on May 18, 1989, XP055734008), translated on Sep. 25, 2020 (4 pages; cited in European Office Action; JPH01126375A previously disclosed in IDS of Dec. 6, 2018 with English abstract and machine translation).

(Continued)

*Primary Examiner* — Richard A Huhn
(74) *Attorney, Agent, or Firm* — Westerman, Hattori, Daniels & Adrian, LLP

(57) ABSTRACT

Provided are a kaolin clay for a thermoplastic resin composition that can provide high impact strength and glossiness and a thermoplastic resin composition containing the same. A kaolin clay for a thermoplastic resin composition is subjected to a surface treatment with 0.2 to 10 parts by mass of at least one selected from the group consisting of methyl silicate, ethyl silicate, propyl silicate, and butyl silicate relative to 100 parts by mass of the kaolin clay.

5 Claims, No Drawings

(56) References Cited

OTHER PUBLICATIONS

Office Action dated Jul. 31, 2020, issued in counterpart Chinese Patent Application No. 201780035142.3 (16 pages, w/ English translation).

* cited by examiner

KAOLIN CLAY FOR THERMOPLASTIC RESIN COMPOSITION AND THERMOPLASTIC RESIN COMPOSITION

TECHNICAL FIELD

The present invention relates to kaolin clays thermoplastic resin compositions and thermoplastic resin compositions containing the same.

BACKGROUND ART

For the purpose of increasing the flexural modulus elasticity of thermoplastic resins, including polyester resins, such as polybutylene terephthalate (PBT), and polyphenylene sulfide resins, a filler, such as talc or mica, is mixed in such a thermoplastic resin. However, mixing with talc, mica or like fillers causes the thermoplastic resin to fail to obtain high glossiness. Therefore, the above fillers have a problem that they cannot be used for applications requiring glossiness.

Kaolin clay can be given as an example of a filler that can provide high glossiness. However, mixing with kaolin clay presents a problem that the thermoplastic resin is decreased in impact strength. The decrease in impact strength can be improved by subjecting kaolin clay to a surface treatment with a silane coupling agent, as disclosed in Patent Literature 1 or others.

CITATION LIST

Patent Literature

Patent Literature 1: JP-A-H10-88028

SUMMARY OF INVENTION

Technical Problem

Nevertheless, there is a demand for a filler that can provide higher impact strength and also provide glossiness to the thermoplastic resin.

An object of the present invention is to provide a kaolin clay for a thermoplastic resin composition that can provide high impact strength and glossiness and a thermoplastic resin composition containing the same.

Solution to Problem

A kaolin clay for a thermoplastic resin composition according to the present invention is subjected to a surface treatment with 0.2 to 10 parts by mass of at least one selected from the group consisting of methyl silicate, ethyl silicate, propyl silicate, and butyl silicate relative to 100 parts by mass of the kaolin clay.

A thermoplastic resin composition according to the present invention is formed so that the above-described kaolin clay according to the present invention is incorporated in a thermoplastic resin.

The thermoplastic resin composition according to the present invention preferably contains the kaolin clay in an amount of 0.1 to 40% by mass.

The thermoplastic resin is preferably polystyrene-based resin, polyester resin, polyphenylene sulfide resin or polyamide resin.

Advantageous Effects of Invention

The present invention enables provision of high impact strength and glossiness to the thermoplastic resin composition.

DESCRIPTION OF EMBODIMENTS

Hereinafter, a description will be given of a preferred embodiment. However, the following embodiment is merely illustrative and the present invention is not limited by the following embodiment.

<Kaolin Clay>

No particular limitation is placed on the type of a kaolin clay for use as an object to be subjected to a surface treatment in the present invention. There are known kaolin clays, such as wet kaolin, fired kaolin, and dry kaolin, among which wet kaolin is preferably used.

The average particle diameter is, in terms of the value measured by a wet method using a laser diffraction particle size distribution measurement device, preferably 0.1 to 20 µm, more preferably 0.3 to 15 µm, and still more preferably 0.5 to 10 µm. If the average particle diameter is too small, the glossiness of a thermoplastic resin composition may decrease. If the average particle diameter is too large, high impact strength and glossiness of the thermoplastic resin composition may not be able <Silicate Treatment>

A kaolin clay for a thermoplastic resin composition according to the present invention is subjected to a surface treatment with at least one silicate selected from the group consisting of methyl silicate, ethyl silicate, propyl silicate, and butyl silicate. Among these silicates, methyl silicate or ethyl silicate is preferably used and ethyl silicate is particularly preferably used.

The amount of silicate for the treatment is, relative to 100 parts by mass of kaolin clay, 0.2 to 10 parts by mass and butyl silicate. Among these silicates, methyl silicate or ethyl silicate is preferably used and ethyl silicate is particularly preferably used.

The amount of silicate for the treatment is, relative to 100 parts by mass of kaolin clay, 0.2 to 10 parts by mass, preferably 0 to 5 parts by mass, and preferably 1 to 3 parts by mass. If the amount of silicate for the treatment is too small, high impact strength and glossiness of the thermoplastic resin composition may not be able to be obtained. If the amount of silicate for the treatment is too large, this may cause problems, such as decrease in the strength of the thermoplastic resin composition.

The method for the surface treatment may be a wet method or a dry method and an example that can be cited is a method of adding a silicate to kaolin clay powder and stirring them to form silicate layers on the surfaces of kaolin clay particles. If needed, the silicate may be added as a dilution with a solvent, such as alcohol. After being stirred, the mixture may be dried if needed. The temperature is preferably 50 to 150° C.

<Thermoplastic Resin Composition>

A thermoplastic resin composition according to the present invention is formed so that the above-described kaolin clay according to the present invention incorporated in a thermoplastic resin.

Examples the thermoplastic resin include polystyrene-based resin, polyester resin polyphenylene sulfide resin, and polyamide resin.

Examples of the polystyrene based resin for use in the present invention include general-purpose polytyrenes (GPPS), syndiotactic polystyrene resins (SPS), high-impact polystyrenes (HIPS), styrene acrylonitrile capalymer resins (SAN), and acrylonitrile butadiene styrene resins (ABS).

Examples of the polyester resin for use in the present invention include polybutylene terephthalate (PBT), polyethylene terephthalate (PET), liquid crystalline polyester (LCP), and polycarbonate (PC).

Examples of the polyamide resin for use in the present invention include Nylon 6 (PA6), Nylon 66 (PA66), Nylon 11 (PA11), Nylon 12 (PA12) semi-aromatic nylon (PPA), Nylon 4T (4TPA) Nylon 6T (6TPA), and Nylon 9T (9TPA).

The amount of kaolin clay mixed is, relative to the whole of the thermoplastic resin composition, preferably 0.1 to 40% by mass and more preferably 1 to 30% by mass. If the amount of kaolin clay mixed is too small, desired strength may not be able to be obtained. If the amount of kaolin clay mixed is too large, desired glossiness may not be able to be obtained.

EXAMPLES

A description will be given below of the present invention with reference to specific examples, but the present invention is not limited to the following examples.
<Production of Silicate-Treated Kaolin Clay>

Using kaolin clay particles with an average particle diameter of 7 µm as a kaolin clay, 100 parts by mass of the kaolin clay was subjected to a surface treatment by a dry method with 2 parts by mass of ethyl silicate. Specifically, ethyl silicate was added dropwise to the kaolin clay while the kaolin clay was stirred with a high-speed stirrer. After the treatment, the mixture was dried at 80° C. for 10 minutes.
<Production of Polybutylene Terephthalate Resin Composition>

Example 1

The silicate-treated kaolin clay obtained in the above manner was mixed at a rate of 10% by mass into 90% by mass polybutylene terephthalate resin (PBT: DURANEX® 2000 manufactured by WinTech Polymer Ltd.), thus producing a polybutylene terephthalate resin composition. Specifically, the polybutylene terephthalate resin and the silicate-treated kaolin clay were loaded in the desired ratio into a biaxial extruder using a metering feeder. The kneading temperature in the biaxial extruder was set at 230 to 250° C. The polybutylene terephthalate resin composition discharged from the biaxial extruder was cut into pellets with a cutter. The obtained pellets of the polybutylene terephthalate resin composition were molded into various types of specimens using an injection molder.

The following measurements were made using the obtained resin composition.
(Flexural Strength and Flexural Modulus of Elasticity)

The flexural strength and flexural modulus of elasticity were evaluated at 23° C. in conformity with ISO 178.
(Charpy Impact Strength)

The Charpy impact strength (notched) was evaluated at 23° C. in conformity with ISO 179.
(Glossiness)

The 60° C. specular glossiness was evaluated in conformity with JIS Z8741.

The measurement results of the flexural strength, flexural modulus of elasticity, Charpy impact strength, and lossiness are shown in Table 1.

Comparative Example 1

A resin composition was produced in the same manner as in Example 1 except that a kaolin clay not subjected to any surface treatment was used, and measured in terms of flexural strength, flexural modulus of elasticity, Charpy impact strength, and glossiness. The measurement results are shown in Table 1.

Comparative Example 2

A resin composition was produced in the same manner as in Example 1 except that a kaolin clay subjected to a surface treatment with, in place of ethyl silicate, 2 parts by mass of a silane coupling agent was used, and measured in terms of flexural strength, flexural modulus of elasticity, Charpy impact strength, and glossiness. The measurement results are shown in Table 1. As the silane coupling agent, N-2-(aminoethyl)-3-aminopropylmethyldimethoxysilane (KBM-602 manufactured by Shin-Etsu Chemical Co., Ltd.) was used.

Comparative Example 3

A resin composition was produced in the same manner as in Example 1 except that talc was used in place of the silicate-treated kaolin clay, and measured in terms of flexural strength, flexural modulus of elasticity, Charpy impact strength, and glossiness. The measurement results are shown in Table 1. As the talc, talc particles with an average particle diameter of 2 µm (SG-95 manufactured by Nippon Talc Co., Ltd.) were used.

Comparative Example 4

Only the resin was used without any filler mixed therein and the resin was measured in terms of flexural strength, flexural modulus of elasticity, Charpy impact strength, and glossiness. The measurement results are shown in Table 1.

TABLE 1

|  | Ex. 1 | Comp. Ex. 1 | Comp. Ex. 2 | Comp. Ex. 3 | Comp. Ex. 4 |
| --- | --- | --- | --- | --- | --- |
| Filler | silicate-treated kaolin clay | kaolin clay | coupling agent-treated kaolin clay | talc | Nothing |
| Flexural Strength (MPa) | 98 | 99 | 99 | 98 | 90 |
| Flexural Modulus of Elasticity (MPa) | 3500 | 3600 | 3500 | 3600 | 2500 |
| Charpy Impact Strength (kJ/m$^2$) | 3.4 | 1.8 | 3.2 | 3.4 | 3.4 |
| Glossiness [60-60] (%) | 90 | 70 | 75 | 65 | 100 |

As shown in Table 1, Example 1 according to the present invention achieved a high impact strength and a high glossiness as compared to Comparative Examples 1 and 2 and achieved a high glossiness as compared to Comparative Example 3.

Production of Polyphenylene Sulfide Resin Composition

Example 2

The silicate-treated kaolin clay as used in Example 1 was mixed at a rate of 20% by mass into by mass polyphenylene sulfide resin (PPS: TORELINA® A-900 manufactured by Toray Industries, Inc.), thus producing a polyphenylene sulfide resin composition.

Using the obtained resin composition, its flexural strength, flexural modulus of elasticity, Charpy impact strength, and glossiness were measured in the same manners as in Example 1. The measurement results are shown in Table 2.

Comparative Example 5

A resin composition was produced in the same manner as in Example 2 except that a kaolin clay not subjected to any surface treatment was used, and measured in terms of flexural strength, flexural modulus of elasticity, Charpy impact strength, and glossiness. The measurement results are shown in Table 2.

Comparative Example 6

A resin composition was produced in the same manner as in Example 2 except that the silane coupling agent-treated kaolin clay as used in Comparative Example 2 was used, and measured in terms of flexural strength, flexural modulus of elasticity, Charpy impact strength, and glossiness. The measurement results are shown in Table 2.

Comparative Example 7

A resin composition was produced in the same manner as in Example 2 except that talc as used in Comparative Example 3 was used, and measured in terms of flexural strength, flexural modulus of elasticity, Charpy impact strength, and glossiness. The measurement results are shown in Table 2.

Comparative Example 8

Only the resin was used without any filler mixed therein and the resin was measured in terms of flexural strength, flexural modulus of elasticity, Charpy impact strength, and glossiness. The measurement results are shown in Table 2.

TABLE 2

|  | Ex. 2 | Comp. Ex. 5 | Comp. Ex. 6 | Comp. Ex. 7 | Comp. Ex. 8 |
| --- | --- | --- | --- | --- | --- |
| Filler | silicate-treated kaolin clay | kaolin clay | coupling agent-treated kaolin clay | talc | Nothing |
| Flexural Strength (MPa) | 135 | 133 | 135 | 141 | 135 |
| Flexural Modulus of Elasticity (MPa) | 6500 | 6660 | 6600 | 6280 | 3670 |
| Charpy Impact Strength (kJ/m$^2$) | 3.8 | 1.7 | 3.8 | 3.8 | 2.6 |
| Glossiness [60-60] (%) | 126 | 118 | 115 | 106 | 79.8 |

As shown in Table 2, Example 2 according to the present invention achieved a high impact strength and a high glossiness as compared to Comparative Examples 5 and 8 and achieved a high glossiness as compared to Comparative Examples 6 and 7.

The invention claimed is:

1. A thermoplastic resin composition, comprising:
   a thermoplastic resin selected from the group consisting of polystyrene-based resin, polyester resin, polyphenylene sulfide resin, polyamide resin, and a combination thereof, and
   a kaolin clay incorporated in the thermoplastic resin,
   wherein the kaolin clay has been surface treated with 0.2 to 10 parts by mass of a silicate that is at least one selected from the group consisting of methyl silicate, ethyl silicate, propyl silicate, and butyl silicate relative to 100 parts by mass of the kaolin clay,
   wherein an amount of the kaolin clay in the thermoplastic resin composition is 0.1 to 20% by mass,
   wherein the thermoplastic resin composition has a 60° C. specular glossiness of at least 90% as measured in accordance JIS Z8741, and
   wherein the thermoplastic resin composition has a flexural modulus elasticity of at least 3500 MPa as measured in accordance with ISO 178.

2. The thermoplastic resin composition according to claim 1, wherein an amount of the kaolin clay in the thermoplastic resin composition is 10 to 20% by mass.

3. The thermoplastic resin composition according to claim 1, wherein the kaolin clay has been surface treated with 0.5 to 5 parts by mass of the silicate.

4. The thermoplastic resin composition according to claim 1, wherein the thermoplastic resin is polyester or polyphenylene sulfide resin.

5. The thermoplastic resin composition according to claim 1, wherein the polystyrene-based resin is at least one selected from the group consisting of general purpose polystyrene, syndiotactic polystyrene, high-impact polystyrene, styrene acrylonitrile copolymer, and acrylonitrile butadiene styrene,
   wherein the polyester resin is at least one selected from the group consisting of polybutylene terephthalate, polyethylene terephthalate, liquid crystalline polyester, and polycarbonate, and
   wherein the polyamide resin is at least one selected from the group consisting of Nylon 6, Nylon 66, Nylon 11, Nylon 12, semi-aromatic nylon, Nylon 4T, Nylon 6T, and Nylon 9T.

* * * * *